3,121,087
AMINO-SUBSTITUTED BUTANOLS AS
COUGH-DEPRESSANTS
Alex Berg, Biberach an der Riss, Germany, assignor to
Dr. Karl Thomae G.m.b.H., Biberach an der Riss, Germany, a corporation of Germany
No Drawing. Filed June 28, 1961, Ser. No. 120,193
10 Claims. (Cl. 260—294.7)

This is a continuation-in-part of copending application Serial No. 15,835 filed March 18, 1960, now abandoned.

This invention relates to basic substituted carbinols and to various methods of preparing the same.

More particularly, the present invention relates to basic-substituted carbinols of the formula

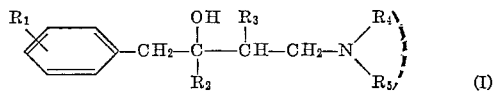

(I)

wherein:

$R_1$ is selected from the group consisting of hydrogen, halogen and lower alkyl, $R_2$ is lower alkyl, preferably with 1 to 2 carbon atoms, $R_3$ is selected from the group consisting of lower alkyl, lower alkenyl, benzyl and phenyl, and $R_4$ and $R_5$, which may be alike or different from each other, are selected from the group consisting of hydrogen and lower alkyl or, together with each other and the nitrogen atom, may form a heterocycle selected from the group consisting of pyrrolidino, piperidino and morpholino, their racemates, optically active antipodes and non-toxic, pharmacologicaly acceptable acid addition salts.

It should be noted that the compounds of the present invention have the essential structural characteristic that the phenyl group

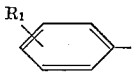

and the amino group

are separated by a chain of 4 carbon atoms the two middle carbon atoms of which are asymmetric carbon atoms where optical isomerism is possible.

The compounds according to the present invention may be prepared by several conventient methods.

For example, they may be prepared by reacting ketones of the general formula

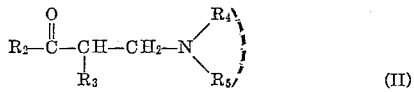

(II)

wherein $R_2$, $R_3$, $R_4$ and $R_5$ have the meanings previously defined, with Grignard reagents of the general formula

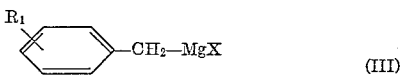

(III)

wherein $R_1$ has the meanings defined above and X is halogen.

Another method of preparing the compounds of the present invention comprises reacting ketones of the formula

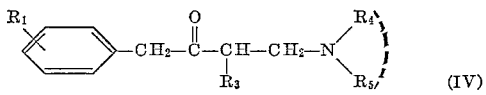

(IV)

wherein $R_1$, $R_3$, $R_4$ and $R_5$ have the meanings previously defined, with a Grignard reagent of the formula

$R_2MgX$ (V)

wherein $R_2$ has the meaning defined above and X is halogen.

Similarly, they may be prepared by reacting basic-substituted propionic acid esters of the general formula

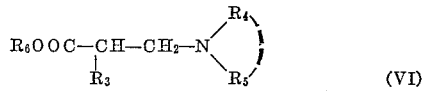

(VI)

wherein $R_3$, $R_4$ and $R_5$ have the meanings previously defined and $R_6$ is lower alkyl, with both of the Grignard reagents of the Formulas III and V. In this method of preparation the basic propionic acid ester VI may be reacted with the two Grignard compounds in any desired sequence or even with both at the same time. This latter variation, that is, reaction of the basic propionic acid ester with both Grignard reagents simultaneously, represents a particularly advantageous method of preparing the carbinols of the present invention because it makes it possible to obtain the desired carbinols by a single step process from the readily accessible basic propionic acid esters.

The processes described above are carried out under conditions which are customarily used in Grignard reactions. Thus, the reactions are carried out in the presence of an anhydrous inert solvent, such as ether, benzene, tetrahydrofuran or mixtures thereof. As the first step, the desired Grignard reagent III or V is prepared from the corresponding halide by well known procedures; in the case of the reaction of the basic propionic acid ester with both Grignard reagents simultaneously, the mixed Grignard reagent is prepared from a mixture of the corresponding halides. Thereafter, the ketone of the Formula II or IV or the propionic acid ester VI is added dropwise to the Grignard reagent solution, preferably while cooling the reaction mixture of an ice bath. After all of the ketone or basic propionic acid ester has been added the reaction is brought to completion, if necessary, by heating the reaction mixture on a water bath. Thus, the reaction is advantageously carried out at temperatures between 0 and 100° C. The quantitative ratio of reactants in the reaction between ketones II or IV and Grignard compounds III or V, respectively, is 1 to 3 mols Grignard compound per mol of ketone; in the reaction between the propionic acid ester VI and the Grignard compounds the quantitative ratio is 1 to 3 mols of each of the Grignard compounds per mol of propionic acid ester.

The substantially anhydrous reaction mixture obtained in each of the above methods is worked up in the usual manner, that is, by pouring it over ice, decomposing the resulting aqueous mixture into an aqueous and an organic phase with a strong acid, isolating the basic carbinol from the aqueous phase and purifying it by distillation. If desired, the free basic carbinol may then be transformed into any desired pharmacologically non-toxic acid addition salt with a physiologically compatible acid, such as hydrochloric acid, sulfuric acid, phosphoric acid, citric acid, tartaric acid, succinic acid and the like. The free bases and their acid addition salts may be divided into their two possible racemic forms by customary methods, such as by fractional crystallization. The racemic compounds may then, in turn, be separated into their optical antipodes by customary methods, such as by fractional crystallization of their salts with dibenzoyl-α-tartaric acid or d-bromo-camphor-sulfonic acid.

The basic ketones of the Formulas II and IV may be prepared from the corresponding ketones, for example, with formaldehyde and a suitable secondary amine. The method of preparation of ketones of the Formulas II and IV is described by Mannich in Archiv der Pharmazie, vol. 264, page 741 (1926); Journal of Organic Chemistry, vol. 18, page 736 (1953); and Journal of the Chemical Society, 1952, page 1,321.

The basic propionic acid esters of the Formula VI may most conveniently be prepared by the method described in Houben-Weyl, vol. 11/1, page 279, i.e. by condensation of amines of the formula

(VII)

with acrylic acid esters of the formula

(VIII)

wherein $R_3$, $R_4$, $R_5$ and $R_6$ have the meanings previously defined.

The following examples will further illustrate the present invention and enable others skilled in the art to understand it more completely. It is understood, however, that the invention is not limited to the particular examples given below.

EXAMPLE I

*Preparation of 1-p-Chlorophenyl-2,3-Dimethyl-4-Dimethylamino-Butanol-(2)*

A solution of 2/10 mol (33 gm.) of 3-methyl-4-dimethyl-amino-butanone-(2) [produced according to Mannich, Arch. Pharm., vol. 265, page 589 (1927)] in 50 cc. absolute ether was added dropwise, while stirring and cooling with ice, to a Grignard solution of 4/10 mol p-cholorbenzyl-magnesium-chloride which was produced from 64.5 gm. p-chlorobenzyl-chloride and 9.8 gm. magnesium in 200 cc. absolute ether. The reaction product was heated for an additional one-half hour under reflux to bring the reaction to completion, and thereafter the reaction mixture was decomposed into an ether phase and an aqueous phase with about 50 cc. concentrated hydrochloric acid and about 200 gm. ice. The ether phase was discarded and the aqueous phase was adjusted to an alkaline pH with ammonia and then thoroughly extracted with ether. After concentrating the united, dried ether extract solutions, the oily residue was fractionally distilled. The reaction product having the structural formula

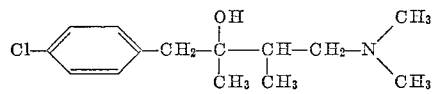

was obtained in the form of a colorless oil having a boiling point of 179 to 181° C. The yield was 48.5 gm. corresponding to 95% of theory.

The hydrochloride addition salt of the above reaction product was prepared in customary fashion, that is by reaction with hydrochloric acid, followed by fractional crystallization from a mixture of alcohol and ether. The two possible racemic forms were obtained thereby. The difficultly soluble racemate had a meltaing point of 169 to 170° C. and the more readily soluble racemate had a boiling point of 145 to 148° C.

In addition to the hydrochloride, the following acid addition salts of the free base were prepared by reacting it with the corresponding acid:

Sulfate, melting point _____ 189° C.
Nitrate, melting point _____ 145° C.
Phosphate, melting point _____ 148° C.
Acid tartrate, melting point _____ 177 to 179° C.
Acid oxalate, melting point _____ 104° C.

EXAMPLE II

*Preparation of 1-Phenyl-2,3-Dimethyl-4-Dimethylamino-Butanol-(2)*

A solution of 29 gm. β-dimethylamino-α-methylpropionic acid methylester in 50 cc. ether was added dropwise over a period of twenty minutes, accompanied by stirring and cooling with ice, to a Grignard solution which had been prepared from 35.5 gm. methyliodide (25/100 mol), 42.8 gm. benzylbromide (25/100 mol) and 13 gm. magnesium turnings in 200 cc. ether. After heating the reaction mixture under reflux for one hour, it was decomposed into an ether phase and an aqueous phase with a mixture of ice and concentrated hydrochloric acid. The ether phase was separated and discarded. The aqueous phase was adjusted to an alkaline pH value with ammonia and was then thoroughly extracted with ether. The ether extract solutions were combined, dried and the ether was then evaporated. For purification, the oily residue was distilled in a vacuum of 12 mm. Hg at 142 to 144° C., yielding 15 gm. of a substance having the structural formula

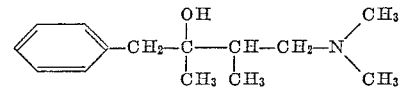

in the form of a faintly yellow oil.

The following table shows eighteen additional basic-substituted carbinols of the general Formula I which were prepared by the methods illustrated in Examples I and II. The table lists the meanings of substituents $R_1$ through $R_5$ of Formula I, the boiling point of the free base and/or the melting point of the hydrochloride addition salt in each case.

TABLE

| Example No. | $R_1$ | $R_2$ | $R_3$ | $R_4$ | $R_5$ | Properties |
|---|---|---|---|---|---|---|
| III | H | $CH_3$ | $CH_3$ | $CH_3$ | $CH_3$ | B.P. 150–152° C. at 12 mm. Hg. |
| IV | H | $CH_3$ | $CH_2$—$C_6H_5$ | $CH_3$ | $CH_3$ | B.P. 166–169° C. at 0.1 mm. Hg. |
| V | H | $C_2H_5$ | $CH_3$ | $CH_3$ | $CH_3$ | B.P. 161–163° C. at 12 mm. Hg. |
| VI | H | $CH_3$ | $C_6H_5$ | $CH_3$ | $CH_3$ | Hydrochloride addition salt; M.P. 240° C. |
| VII | p-Cl | $C_2H_5$ | $CH_3$ | $CH_3$ | $CH_3$ | B.P. 186–188° C. at 12 mm. Hg. Hydrochloride addition salt; M.P. 218–220° C. |
| VIII | p-$CH_3$ | $CH_3$ | $CH_3$ | $CH_3$ | $CH_3$ | B.P. 157–169° C. at 12 mm. Hg. |
| IX | H | $CH_3$ | $CH_2$—CH‖$CH_2$ | $CH_3$ | $CH_3$ | B.P. 163–167° C. at 12 mm. Hg. |
| X | o-Cl | $CH_3$ | $CH_3$ | $CH_3$ | $CH_3$ | B.P. 171–173° C. at 12 mm. Hg. Hydrochloride addition salt: M.P. 160° C. |
| XI | H | $CH_3$ | $C_2H_5$ | $CH_3$ | $CH_3$ | B.P. 162–164° C. at 12 mm. Hg. |
| XII | p-Cl | $CH_3$ | $C_2H_5$ | $CH_3$ | $CH_3$ | B.P. 187–188° C. at 12 mm. Hg. |
| XIII | p-Cl | $CH_3$ | $CH_3$ | $C_2H_5$ | $C_2H_5$ | B.P. 205–208° C. at 15 mm. Hg. |
| XIV | H | $CH_3$ | $CH_3$ | \multicolumn{2}{c}{N(CH_2CH_2)_2CH_2 ring} | B.P. 192–194° C. at 20 mm. Hg. Hydrochloride addition salt; M.P. 206–208° C. |

TABLE—Continued

| Example No. | R₁ | R₂ | R₃ | R₄ | R₅ | Properties |
|---|---|---|---|---|---|---|
| XV | p-Cl | CH₃ | CH₃ | $\begin{array}{c}\mathrm{N}\\ /\ \ \backslash\\ CH_2\ \ \ CH_2\\ |\ \ \ \ \ \ |\\ CH_2\ \ \ CH_2\\ \backslash\ /\\ CH_2\end{array}$ | | B.P. 168–170° C. at 0.3 mm. Hg., Hydrochloride addition salt; M.P 215–217° C. |
| XVI | p-Cl | CH₃ | CH₃ | $\begin{array}{c}\mathrm{N}\\ /\ \ \backslash\\ CH_2\ \ \ CH_2\\ |\ \ \ \ \ \ |\\ CH_2\text{—}CH_2\end{array}$ | | B.P. 210–215° C. at 20 mm. Hg. |
| XVII | m-CH₃ | CH₃ | CH₃ | CH₃ | CH₃ | B.P. 165–168° C. at 12 mm. Hg. |
| XVIII | H | CH₃ | CH₃ | $\begin{array}{c}\mathrm{N}\\ /\ \ \backslash\\ CH_2\ \ \ CH_2\\ |\ \ \ \ \ \ |\\ CH_2\text{—}CH_2\end{array}$ | | B.P. 200–203° C. at 20 mm. Hg. |
| XIX | p-Br | CH₃ | CH₃ | CH₃ | CH₃ | B.P. 156–160° C. at 0.5 mm. Hg. |
| XX | m-Cl | CH₃ | CH₃ | CH₃ | CH₃ | B.P. 182–183° C. at 12 mm. Hg. |

The compounds of the present invention, that is, those embraced by Formula I above and their racemates, optically active antipodes and non-toxic, pharmacologically acceptable acid addition salts, are very effective bechics, i.e. cough-depressants, with an activity about as great as that of codeine, whereas surprisingly they do not exhibit any noticeable analgesic activity, nor do they display the well known undesirable side effects encountered with codeine. It is noteworthy that even the racemates exhibit this surprising activity.

The mean individual effective dose of 1-p-chlorophenyl-2,3-dimethyl-4-dimethylamino-butanol-(2), which is the compound illustrated in Example I, is from 30 to 60 mgm., and the mean daily effective dose is from 90 to 120 mgm.

The compounds in accordance with the present invention may be administered in the form of dosage unit compositions, such as drops, syrups, tablets, coated pills, suppositories, ampoules or the like.

The following examples illustrate various dosage unit compositions adapted for internal administration of the compounds according to the present invention.

EXAMPLE XXI

Drops:

A

| | | |
|---|---|---|
| p-Hydroxy-methyl benzoate | gm | 0.035 |
| p-Hydroxy-propyl benzoate | gm | 0.015 |
| Anise oil | gm | 0.05 |
| Menthol | gm | 0.06 |
| Ethanol (pure) | gm | 10.00 |

B

| | | |
|---|---|---|
| 1-p-chlorophenyl-2,3-dimethly-4-dimethyl-amino-butanol-(2) | gm | 6.00 |
| Saccharin-sodium | gm | 1.00 |
| Glycerin | gm | 15.00 |
| Distilled water, q.s. ad | cc | 100.00 |

1 cc. contains 60 mgm. 1-p-chlorophenyl-4-dimethylamino-butanol-(2).

The p-hydroxy benzoic esters, the anise oil and the menthol are dissolved in ethanol (solution A). The saccharin-sodium and the 1-p-chlorophenyl-2,3-dimethyl-4-dimethylamino-butanol-(2) are dissolved in water, and the glycerin is added thereto (solution B). Solutions A and B are then admixed with each other, and are then filtered until clear.

EXAPLE XXII

Pectoral syrup:

| | | |
|---|---|---|
| 1-p-chlorophenyl-2,3-dimethyl-4-dimethyl-amino-butanol-(2) | gm | 0.50 |
| Sugar | gm | 70.00 |
| Tartaric acid (pure) | gm | 0.30 |
| Sec. sodium phosphate.12H₂O | gm | 2.40 |
| Saccharin-sodium | gm | 0.20 |
| p-Hydroxy-methyl benzoate | gm | 0.07 |
| p-Hydroxy-propyl benzoate | gm | 0.03 |
| Eucalyptus-menthol flavoring | gm | 0.11 |
| Raspberry flavoring | gm | 0.02 |
| Ethanol (pure) | gm | 2.00 |
| Distilled water, q.s. ad | cc | 100.00 |

10 cc. contain 50 mgm. 1-p-chlorophenyl-2,3-dimethyl-4-dimethylamino-butanol-(2)

About 50 cc. of the distilled water are heated to 80° C., and the p-hydroxy-benzoic esters, the sugar, the saccharin-sodium, the tartaric acid, the sec, sodium phosphate and the 1-p-chlorophenyl-2,3-dimethyl-4-dimethyl-amino-butanol-(2) are dissolved therein. A solution of the eucalyptus-menthol flavoring and raspberry flavoring in the remaining amount of water is then stirred into the ethanol. The two solutions are combined and the resulting solution is then filtered until clear.

EXAMPLE XXIII

Tablets:

1 tablet contains—

A

| | Mgm. |
|---|---|
| 1-p-chlorophenyl-2,3-dimethyl-4-dimethyl-amino-butanol-(2) | 30.0 |
| Sec. calcium phosphate | 40.0 |

B

| | |
|---|---|
| Lactose | 90.0 |
| Potato starch (dry) | 40.0 |
| Soluble starch | 5.0 |
| Talcum | 13.0 |
| Magnesium stearate | 2.0 |
| Total weight | 220.0 |

A mixture of the 1-p-chlorophenyl-2,3-dimethyl-4-dimethylamino-butanol-(2) and the calcium phosphate is moistened with 80% ethanol, and the moist mass is granulated by passing it through a screen having a mesh width of 1 mm., and is then dried at 45° C. to obtain granulate A. A mixture of the lactose and the potato starch is moistened with an aqueous 15% solution of the soluble starch, and the moist mass is granulated by passing it through a screen having a mesh width of 1 mm., and is then dried at 45° C. to obtain granulate B. The two granulates are then admixed with the remaining additives and pressed into tablets having a diameter of about 9 mm.

EXAMPLE XXIV

Coated pills:

The tablets obtained in accordance with Example XXIII are coated in known manner with a thin shell consisting substantially of sugar and talcum. The coated pills are polished by means of beeswax.

Total weight of a pill: 350 mgm.

EXAMPLE XXV

Suppositories:
1 suppository contains—

| | Mgm. |
|---|---|
| 1 - p - chlorophenyl-2,3-dimethyl-4-dimethylamino - butanol-(2) | 50.0 |
| Suppository base (cocoa butter) | 1670.0 |
| Total weight | 1720.0 |

The active ingredient is passed through a screen having a mesh width of 0.15 mm. and is then added to the molten cocoa butter at 37° C. The resulting mixture is cooled with stirring to 32° C. and poured into precooled suppository molds.

EXAMPLE XXVI

Infant suppositories:
1 suppository contains—

| | Mgm. |
|---|---|
| 1 - p - chlorophenyl-2,3-dimethyl-4-dimethylamino - butanol-(2) | 25.0 |
| Suppository base (cocoa butter) | 975.0 |
| Total weight | 1000.0 |

The compounding procedure is the same as in Example XXV.

EXAMPLE XXVII

Ampoules:
1 ampoule contains—

| | | |
|---|---|---|
| 1 - p - chlorophenyl-2,3-dimethyl-4-dimethylamino - butanol-(2) | mgm | 20.0 |
| Sodium chloride | mgm | 5.0 |
| Double-distilled water, q.s. ad | cc | 2.0 |

The 1 - p-chlorophenyl-2,3-dimethyl-4-dimethylaminobutanol-(2) and the sodium chloride are dissolved in a little of the double-distilled water, and the solution is diluted with the remaining water to the desired volume. The resulting solution is filtered until free of suspended particles, filled into white 2 cc. ampoules, and the ampoules are sterilized for thirty minutes at 100° C.

It is obvious that the 1-p-chlorophenyl-2,3-dimethyl-4-dimethylamino-butanol-(2) is used merely as an illustrative active ingredient in Examples XXI through XXVII; it may, of course, be replaced by any of the other carbinol compounds embraced by Formula I above.

While I have illustrated my invention with the aid of certain embodiments, it will be readily apparent to those skilled in the art that my invention is not limited to these embodiments and that various changes and modifications may be made without departing from the spirit of the invention or the scope of the appended claims.

I claim:

1. Compounds selected from the group consisting of basic-substituted carbinols of the formula

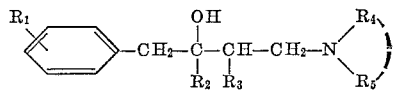

wherein:

$R_1$ is selected from the group consisting of hydrogen, chlorine, bromine and methyl, $R_2$ is lower alkyl with 1 to 2 carbon atoms, $R_3$ is selected from the group consisting of lower alkyl, lower alkenyl, phenyl and benzyl, and $R_4$ and $R_5$ are selected from the group consisting of methyl, ethyl and, together with each other and the nitrogen atom, pyrrolidyl and piperidyl heterocycles, their racemates, optically active antipodes and non-toxic, pharmacologically acceptable acid addition salts.

2. 1 - p - chlorophenyl-2,3-dimethyl-4-dimethylamino-butanol-(2).

3. 1 - phenyl - 2,3-dimethyl-4-dimethylamino-butanol-(2).

4. 1 - phenyl - 2 - ethyl-3-methyl-4-dimethylamino-butanol - (2).

5. 1 - o - chlorophenyl-2,3-dimethyl-4-dimethylamino-butanol-(2).

6. 1 - phenyl - 2,3 - dimethyl-4-(piperidyl-1)-butanol-(2).

7. 1 - m - tolyl-2,3-dimethyl-4-dimethylamino-butanol-(2).

8. 1 - p - tolyl-2,3-dimethyl-4-dimethylamino-butanol-(2).

9. 1 - phenyl - 2 - methyl-3-benzyl-4-dimethylamino-butanol-(2).

10. 1 - p - bromophenyl-2,3-dimethyl-4-dimethylamino-butanol-(2).

References Cited in the file of this patent

UNITED STATES PATENTS

| 2,665,278 | Schultz | Jan. 5, 1954 |
| 2,717,895 | Sprague et al. | Sept. 13, 1955 |
| 2,765,307 | Schmidle | Oct. 2, 1956 |
| 2,771,469 | Schultz | Nov. 20, 1956 |

FOREIGN PATENTS

| 529,490 | Canada | Aug. 21, 1956 |
| 532,969 | Canada | Nov. 13, 1956 |